US008667185B2

(12) United States Patent
Tailliet

(10) Patent No.: US 8,667,185 B2
(45) Date of Patent: Mar. 4, 2014

(54) METHOD AND DEVICE FOR COMMUNICATION BETWEEN A MASTER AND A NUMBER OF SLAVES ACCORDING TO A SERIAL COMMUNICATION PROTOCOL, IN PARTICULAR OF THE OPEN DRAIN TYPE

(75) Inventor: François Tailliet, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 291 days.

(21) Appl. No.: 13/326,922

(22) Filed: Dec. 15, 2011

(65) Prior Publication Data

US 2012/0159025 A1 Jun. 21, 2012

(30) Foreign Application Priority Data

Dec. 17, 2010 (FR) ..................................... 10 60699

(51) Int. Cl.
*G06F 13/42* (2006.01)
*G06F 12/06* (2006.01)
*H04L 12/413* (2006.01)

(52) U.S. Cl.
CPC ........ *G06F 13/4282* (2013.01); *G06F 12/0684* (2013.01); *H04L 12/4135* (2013.01)
USPC .................................... 710/9; 710/8; 710/110

(58) Field of Classification Search
CPC . G06F 12/0684; G06F 21/73; G06F 13/4282; H04L 12/4135
USPC ........................................................ 710/110
See application file for complete search history.

(56) References Cited

U.S. PATENT DOCUMENTS

| 5,696,994 | A | 12/1997 | Pang | |
|---|---|---|---|---|
| 6,189,059 | B1 * | 2/2001 | Sotek et al. | 710/104 |
| 6,209,022 | B1 * | 3/2001 | Sotek et al. | 709/209 |
| 7,099,970 | B1 * | 8/2006 | Foegelle et al. | 710/110 |
| 7,444,453 | B2 * | 10/2008 | Ellison | 710/311 |
| 7,689,756 | B2 * | 3/2010 | Ellison | 710/311 |

(Continued)

FOREIGN PATENT DOCUMENTS

| WO | WO 96/37851 | 11/1996 |
|---|---|---|
| WO | WO 2006/117750 A1 | 11/2006 |

OTHER PUBLICATIONS

République Française Institut National De La Propriété Industrielle, Rapport De Recherche Préliminaire (Preliminary Search Report); issued in French Patent Application No. 1060699 on May 13, 2011 (6 pages).

*Primary Examiner* — Ryan Stiglic
(74) *Attorney, Agent, or Firm* — Slater & Matsil, L.L.P

(57) ABSTRACT

According to one implementation, the slave identifier bits are tested recursively in groups of p bits. For these p bits, each slave will recognize, in its p corresponding identifier bits, one combination out of the 2p possible combinations. The slaves respond simultaneously (20) over the bus, for example an I2C bus, to a request from the master. The response is given by outputting a series of "1" bits in which each slave inserts a "0", which is, for example, the priority logic value on the bus, the position of the "0" in the series of "1" bits being dependent on the binary value of the combination recognized by the slave in the group of p bits of its identifier. The master progressively determines on the fly, based on the bits of the frame received, the values of bits of these digital information items.

26 Claims, 25 Drawing Sheets

(56) References Cited

U.S. PATENT DOCUMENTS

| | | |
|---|---|---|
| 8,112,569 B2 * | 2/2012 | Vitanescu .................... 710/305 |
| 2007/0156935 A1 * | 7/2007 | Ellison ......................... 710/106 |
| 2008/0201511 A1 | 8/2008 | Deshpande et al. |
| 2008/0256276 A1 * | 10/2008 | Ellison ......................... 710/106 |
| 2008/0270654 A1 * | 10/2008 | Reberga ....................... 710/110 |
| 2009/0031048 A1 * | 1/2009 | Richards et al. ................. 710/3 |
| 2010/0185784 A1 * | 7/2010 | De Nie et al. .................... 710/9 |
| 2012/0079151 A1 * | 3/2012 | Tailliet et al. ................. 710/110 |
| 2012/0084378 A1 * | 4/2012 | Kaneko et al. ................ 709/208 |
| 2012/0137022 A1 * | 5/2012 | Cala' ................................. 710/3 |

\* cited by examiner

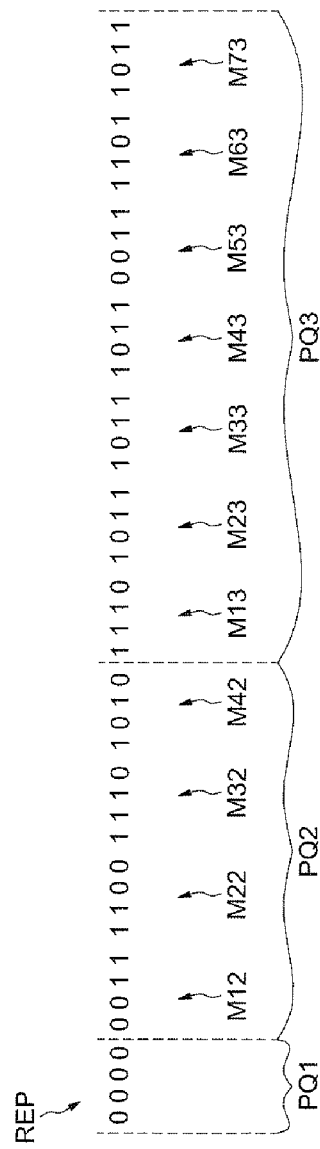

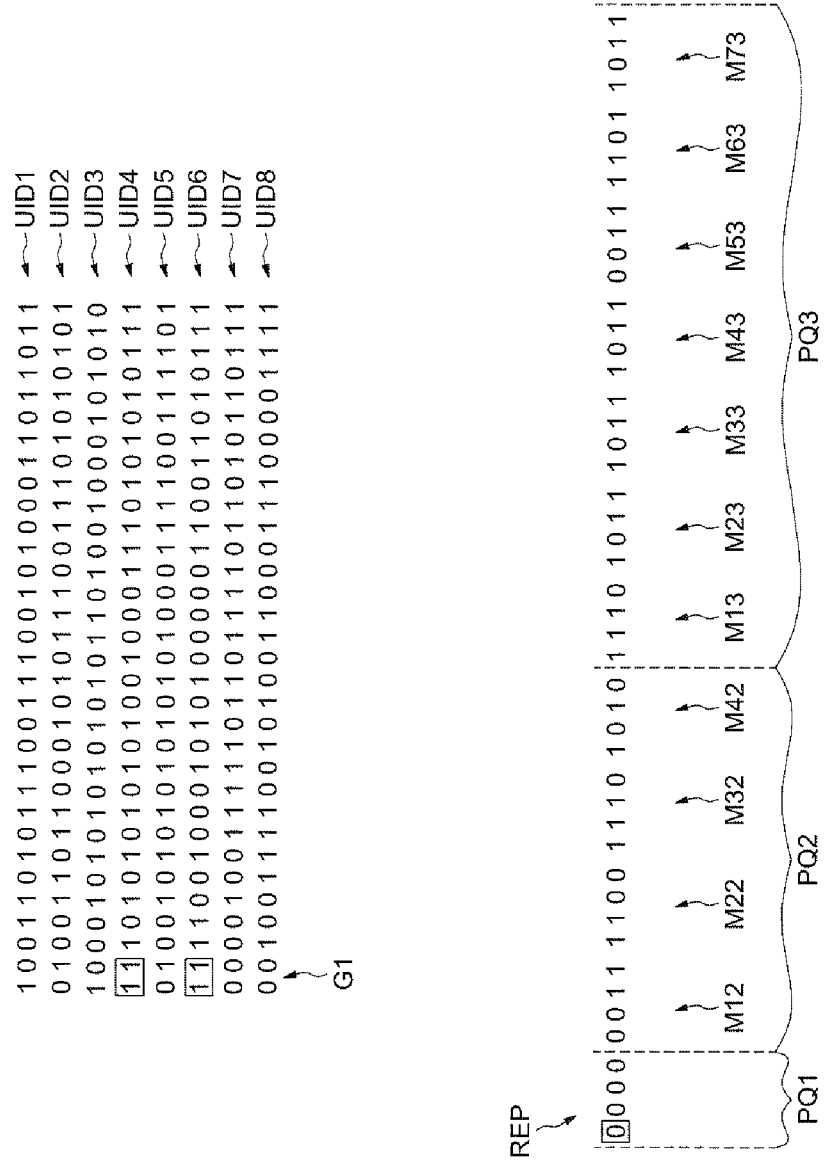

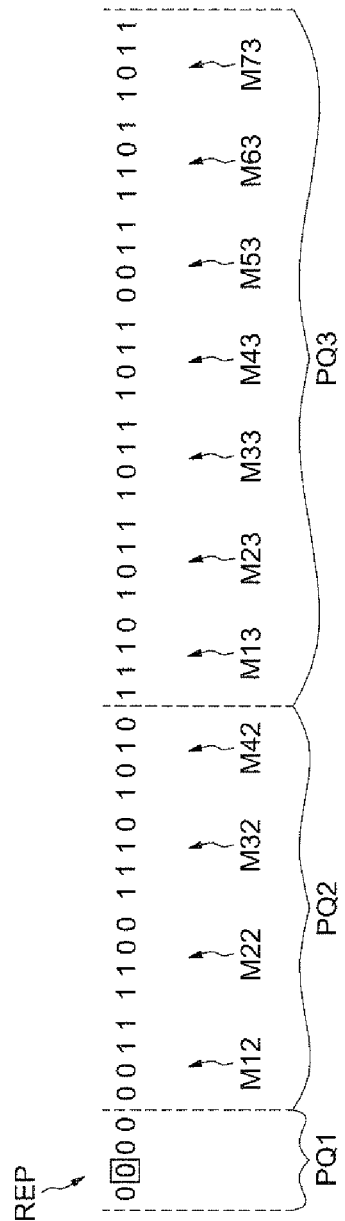

FIG.25

$SC_7C_6C_5C_4C_3C_2C_1C_0$a00000011A11001110A10101110A10101110A10111011A10110011A11011011nABP

METHOD AND DEVICE FOR COMMUNICATION BETWEEN A MASTER AND A NUMBER OF SLAVES ACCORDING TO A SERIAL COMMUNICATION PROTOCOL, IN PARTICULAR OF THE OPEN DRAIN TYPE

CROSS-REFERENCE TO RELATED APPLICATIONS

This application claims the priority benefit of French patent application number 1060699, filed on Dec. 17, 2010, which is hereby incorporated by reference to the maximum extent allowable by law.

TECHNICAL FIELD

The invention relates generally to electronic devices and systems and, in particular embodiments, to a method and device for communication between a master and a number of slaves according to a serial communication protocol, in particular of the open drain type.

BACKGROUND

In some applications, it may be necessary, when a number of slaves are present on a bus designed for a serial communication protocol of the open drain type, to be able to identify them even though they are not initially discernible by their address.

Now, currently, it is not possible, with conventional serial protocols such as the I2C protocol for example, to manage the response conflicts when a number of slave circuits respond simultaneously over the bus.

SUMMARY OF THE INVENTION

Embodiments of the invention relate to communication between a master and a number of slaves, in particular connected to a bus over which the slaves and the master communicate according to a serial communication protocol of the open drain type, for example an I2C (Inter Integrated Circuit) protocol.

Particular embodiments of the invention relate to an open drain serial protocol inventory method, and management of simultaneous responses by the slaves.

According to one implementation and embodiment, there are proposed a method and a device that make it possible to address, over a serial bus of the open drain type, slaves that do not initially know one another, in unlimited numbers, known or unknown, with no addressing constraint.

According to one implementation and embodiment, there are proposed a method and a device which make it possible to very simply identify a known number n of slaves.

According to one implementation, there is proposed a method for iterative recognition, by groups of bits, of some or all of the digital information items, for example their identifier, associated with the slave modules, or, more simply, slaves.

For the case where the number of slaves to be recognized is known, for example n, the iterative recognition can be stopped as soon as n slaves have been identified (in this case, only a part of the identifier may be recovered and is sufficient to discern the different slaves).

For the case where the number of slaves is not known, the iterative recognition may have to run its full term to recover all the identifier bits.

According to one implementation, the identifier bits are tested recursively in groups of p bits (there are therefore 2p combinations of possible values per group). For these p bits, each slave will recognize, in its p corresponding identifier bits, one combination out of the 2p possible combinations. The slaves respond simultaneously over the bus, for example the I2C bus, to a request from the master. The response is given by outputting a series of "1" bits in which each slave inserts a "0", which is, for example, the priority logic value on the bus, the position of the "0" in the series of "1" bits being dependent on the binary value of the combination recognized by the slave in the group of p bits of its identifier.

Once the response to the first group of p bits has been obtained, the second group of p bits has to be tested. If the first group of p bits has had a number of recognized combinations, each recognized combination for the first group gives rise to a response for the recognition of the second group. The recognition responses of the second group are sequential, in the order corresponding to the binary value recognized in the first group. The same principle is applied for the third group and the subsequent groups.

Thus, according to one aspect, there is proposed a method for communication between a master module and a number of slave modules connected to a bus over which the slave modules communicate simultaneously with the master module according to a serial communication protocol of the priority logic state type. The method comprises a transmission to the master module of a succession of packets of 2p-bit digital words, p being greater than or equal to 1. The successive packets are respectively associated with successive groups of p digital information bits, for example identifiers, associated with the slave modules and intended to be communicated to the master module. The 2p bits of a current word of a current packet are respectively associated with the 2p possible combinations of values of the bits of the group associated with the current packet. These 2p possible combinations are taken in a predetermined order. The value of each bit of the current word has the priority logic state, for example the logic "0" state, if the values of the p bits of the digital information item of at least one of the slave modules correspond to the combination of values associated with this bit, and the other logic state otherwise. The method also includes a determination by the master module of the values of the bits of the digital information items associated with the slave modules on the basis of the values of the bits of the words successively received.

Instead of directly transmitting the digital information items, there is advantageously provided a transmission to the master module of a succession of packets of digital words of 2p bits in which the values of the bits are representative of the values of the bits of these digital information items, and ultimately making it possible to determine, from the bits of the frame received by the master module, the values of bits of these digital information items.

In the determination step, the master module is capable of determining (reconstructing) the values of p bits of the digital information items each time a bit having the priority logic value is received.

This reconstruction (determination) of the bits of the digital information items is thus done progressively, that is to say step by step, on the basis of the bits received and the synchronism on the master side and the slave side is kept.

That said, even though this reconstruction is done step by step on the basis of the bits received, in particular those having the priority logic value, it can be performed, for example, after the complete frame or a part of this frame has been received and stored, or else on the fly, that is to say at the rate of the bits successively received, and in particular at the rate of the bits received that have the priority logic value.

For a group of p bits of its associated digital information item, a slave will transmit over the bus a "0" or a "1" according to the values of these p bits. Since the slaves transmit simultaneously over the bus and if the priority logic state is the "0" state, a "1" will be transmitted over the bus if all the slaves transmit a "1" whereas a "0" will be transmitted over the bus if at least one slave transmits a "0" even if the other slaves simultaneously transmit a "1".

According to one implementation, the slave modules analyze the contents of the different words circulating successively over the bus, the number of words of the first packet is equal to one, and the number of words of a packet of current rank greater than one depends on the number of words of the packet of preceding rank and on the values of bits of these words.

The number of words of the packet of current rank is, for example, equal to the number of bits having the priority logic state in the packet of preceding rank.

Although the method can be applied for any value of p greater than or equal to one and less than or equal to a number P of bits of the digital information items, for example the identifiers, it has proven advantageous to use for p a value taken to be equal to two or three, for example equal to two. In practice, this provides a good trade-off between, in particular, the processing speed and the number of possible combinations of values of the bits of a group.

The bus is, for example, a so-called open drain or collector bus with a priority logic state equal to zero.

According to one implementation, the master module can order the stoppage of the transmission of the words over the bus by the master modules, after having determined only some of the values of the bits of the digital information items associated with the slave modules.

Such is the case in particular when the number of slave modules to be identified is known. In this case, as soon as a portion of the identifiers making it possible to discriminate the known number of slave modules is obtained, it is possible to stop the determination of the values of the bits of the digital information items associated with the slave modules.

According to another aspect, a device comprises a master module and a number of slave modules connected to a bus over which the slave modules are configured to communicate simultaneously with the master module according to a serial communication protocol of the priority logic state type. The slave modules comprise transmission circuitry configured to transmit to the master module a succession of packets of digital words of 2p bits, p being greater than or equal to 1. The successive packets are respectively associated with successive groups of p bits of digital information items associated with the slave modules and intended to be communicated to the master module. The 2p bits of a current word of a current packet re respectively associated with the 2p possible combinations, taken in a predetermined order, of the values of the bits of the group associated with the current packet. The value of each bit of the current word has the priority logic state if the values of the p bits of the digital information item of at least one of the slave modules correspond to the combination of values associated with this bit, and the other logic state otherwise. The master module comprises processing circuitry configured to perform a determination of the values of the bits of the digital information items associated with the slave modules on the basis of the values of the bits of the words successively received.

According to one embodiment, the slave modules comprise analysis circuitry configured to analyze the contents of the different words circulating successively over the bus. The transmission circuitry is configured to transmit the succession of packets in which the number of words of the first packet is equal to one, and the number of words of a packet of current rank greater than one depends on the number of words of the packet of preceding rank and on the values of the bits of these words.

For example, the number of words of the packet of current rank is equal to the number of bits having the priority logic state in the packet of preceding rank.

According to one embodiment, the master module also comprises control circuitry configured to order the stoppage of the transmission of the words over the bus after having determined only some of the values of the bits of the digital information items associated with the slave modules.

Each slave module may comprise an output stage of the open drain or collector type connected to the bus.

As a variant, each slave module may comprise an output stage connected to the bus and comprising first activatable circuitry arranged to configure the output stage in a configuration of the symmetrical type (commonly referred to by those skilled in the art as "push-pull"). Second activatable circuitry is arranged to configure the output stage in a configuration of the open drain or collector type. Controllable activation circuitry is configured to selectively activate the first or the second activatable circuits in response to an activation signal. The first means and the second circuits comprise a common part.

Such an embodiment makes it possible to be able to apply the method defined above for the communication between a master and a number of slaves configured to dialogue a priori according to a communication protocol which is not of the open drain type, for example an SPI (Serial Peripheral Interface) protocol. Such is the case in particular for the dialogue between a processor and a number of electrically erasable and programmable read-only memory modules (EEPROM memories). In this case, by modifying the configuration of the output stages, the SPI bus is converted into an open drain type bus, which makes it possible to support the communication method defined above. It is thus possible, for example, to easily detect and/or identify the memory modules without using the "chip select" line of the SPI bus.

According to another aspect, there is proposed a master module belonging to the device as defined above.

According to yet another aspect, there is also proposed a slave module belonging to the device as defined above.

BRIEF DESCRIPTION OF THE DRAWINGS

Other advantages and characteristics of the invention will become apparent from reading the detailed description of nonlimiting implementations and embodiments, and the appended drawings in which:

FIGS. 3 to 24 illustrate a particular exemplary implementation of the method according to the invention, FIG. 25 relates to another particular exemplary implementation of the method according to the invention, and, FIGS. 26 to 28 schematically illustrate other embodiments of an output stage connected to the bus.

DETAILED DESCRIPTION OF ILLUSTRATIVE EMBODIMENTS

Figure 1:
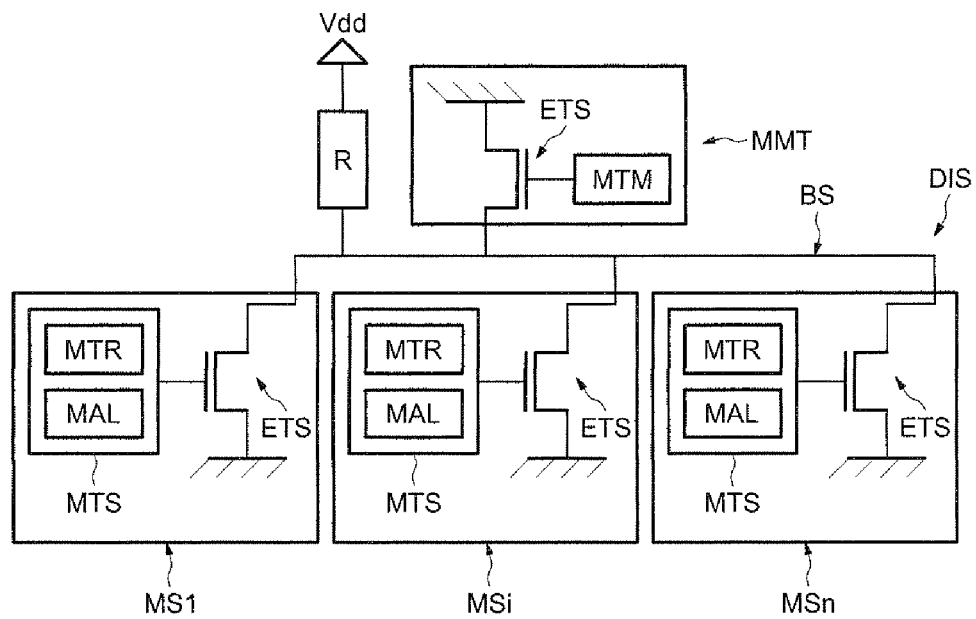
FIG. 1 schematically illustrates an embodiment of a device according to the invention, FIG. 2 schematically illustrates steps of one implementation of a method according to the invention.

In FIG. 1, the reference DIS designates a device comprising, in the present case, a master module MMT, more simply designated "master", and a number of slave modules MS1-MSn, more simply designated "slaves".

The master MMT and the slaves MSi are connected to a bus BS and are capable of communicating according to a serial communication protocol of the priority logic state type.

In the present case, it will be assumed that the communication protocol is an open drain or collector protocol, well known to those skilled in the art, for example an I2C protocol.

In this respect, each slave MSi comprises an output stage ETS of the open drain or collector type, of conventional structure and known per se by those skilled in the art. More specifically, this output stage ETS comprises a transistor whose source is linked to the ground, whose drain is linked to the bus BS, and whose gate is controlled by slave processing means MTS, for example produced as software within a processor and/or wholly or partly by logic circuits. These means MTS comprise transmission means MTR and analysis means MAL.

Similarly, the master module MMT comprises an output stage ETS of an integral structure, the gate of the transistor of this stage ETS being controlled by master processing means MTM which are, for example, also produced as software within a microprocessor.

There is also provided, conventionally and in a manner known per se, a resistor R connected between the power supply voltage Vdd, for example 5 volts, and the bus BS.

In such a configuration, the priority logic state on the bus BS is a logic "0". In practice, the pull-up resistor(s) R makes/make it possible for the dataline of the bus BS to be at the high logic level (logic 1 level) if all the outputs (drains) of the output stages are also at the 1 level. However, if at least one output of an output stage imposes a low level on the line of the bus BS (the corresponding transistor is conducting), this will result in a low level (logic 0 state) on the corresponding line, regardless of the levels of the drains of the other output stages.

The I2C bus comprises two communication wires, namely a data wire designated "SDA" (Serial Data) used to transmit the data, and another wire, designated "SCL" ("Serial Clock") used to transmit a synchronous clock signal.

FIG. 1 shows, in the interests of simplicity, only the data wire SDA of the bus BS to which are connected the output stages ETS.

Figure 2:
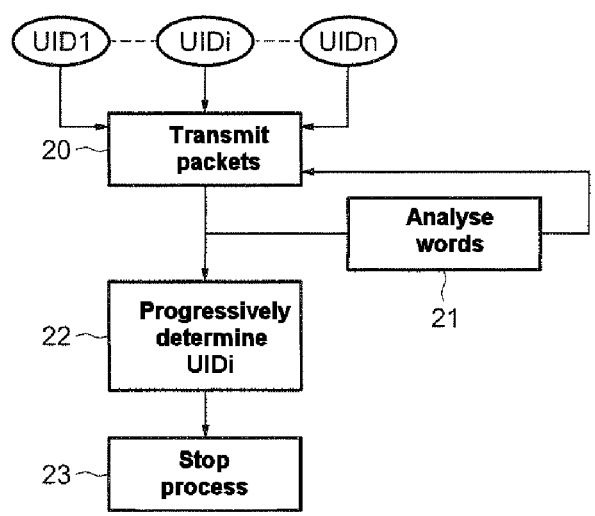

Reference is now made more particularly to FIG. 2, to describe the broad outlines of one implementation of a communication method according to the invention.

It is assumed here that the slaves must transmit, over the bus, to the master, digital information items here consisting of their respective identifier UID1-UIDn.

Each identifier UIDi consists of P bits.

Instead of directly transmitting the digital information items UIDi, there is provided a transmission by the transmission circuitry MTR of the slave modules, to the master module MMT, of a succession of packets of digital words of 2p bits, p being greater than or equal to 1, and less than or equal to P.

The successive packets are respectively associated with successive groups of p bits of the digital information items.

The slaves simultaneously transmit over the bus BS (step 20), for example in response to a command or request from the master. The 2p bits of a current word of a current packet are respectively associated with the 2p possible combinations of values of the bits of the group associated with the current packet, these 2p possible combinations being taken in a predetermined order.

The value of each bit of the current word has the priority logic state, in this case the logic "0" state, if the values of the p bits of the digital information item of at least one of the slave modules correspond to the combination of values associated with this bit.

Otherwise, the value of the bit of the current word has the other logic state, that is to say, the non-priority logic state, in this case the logic "1" state.

In other words, for a group of p bits of its identifier, a slave will transmit over the bus a "0" or a "1" according to the values of these p bits. Since the slaves transmit simultaneously over the bus, a "1" will be transmitted over the bus if all the slaves transmit a "1" whereas a "0" will be transmitted over the bus if at least one slave transmits a "0" even if the other slaves simultaneously transmit a "1".

The processing circuitry MTM of the master will then be able to progressively determine the bits of the identifiers on the basis of the bits received over the bus (step 22).

As will be seen in more detail below, it is possible for the control circuitry incorporated in the processing circuitry MTM to stop the process (step 23), so as to determine only some of the identifiers, for example in the case where the number of slaves to be identified is known and a number of bits of the identifiers making it possible to differentiate the different slaves has been determined.

Advantageously in this exemplary implementation, the method also comprises an analysis by the analysis circuitry MAL of the slaves (step 21) of the contents of the different words circulating successively over the bus, which makes it possible to optimize the transmission 20 of the packets, in particular in terms of number of words in each packet.

Reference is now made more particularly to FIGS. 3 to 23, to describe a practical exemplary implementation of the method.

In this example, it is assumed (FIG. 3) that the number of slaves is equal to 8. The identifier UIDi of each slave consists of 32 bits (P=32).

Only the number of slaves is known to the master, the identifiers of these slaves are, however, not known.

The identifier bits will be tested in groups of two (p=2).

In this implementation, the method will make it possible to differentiate the eight slaves.

To this end, the master sends a specific command and, as will be seen in more detail later, at least some of the slaves generate a response REP, a part of the content of which is illustrated in FIG. 4.

This response here comprises three successive packets PQ1, PQ2, PQ3.

The first packet PQ1 comprises a word of four bits whereas the second packet PQ2 comprises four words of four bits M12, M22, M32, M42 and the third packet PQ3 comprises seven words of four bits M13, M23, M33, M43, M53, M63, M73.

Reference is now made more particularly to FIGS. 5 to 23 to describe the generation of the words and packets of the response REP.

Since the bits of the different identifiers UIDi will be tested in successive groups of two bits (p=2), there are $2^2$ possible combinations of values for each group.

The different possible combinations will be studied in a predetermined order, for example in the order 11, 10, 01, 00.

First of all, the slaves for which the first group G1 of two bits of the identifier has the combination 11 respond simultaneously by transmitting the priority logic state ("0") over the bus. This is the first bit of the word of the packet PQ1 (FIG. 5).

Then, the slaves for which the first group G1 of two bits of the identifier has the combination 10 respond with a logic "0". This is the second bit of the word of the packet PQ1 (FIG. 6).

Figure 7:
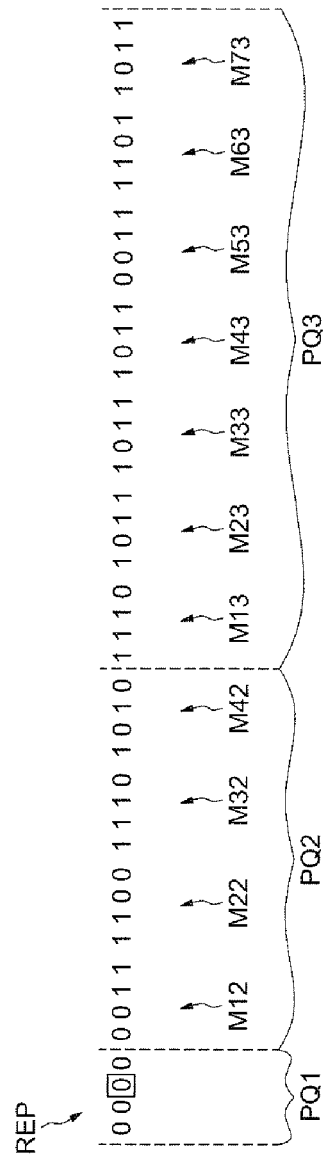
Figure 8:
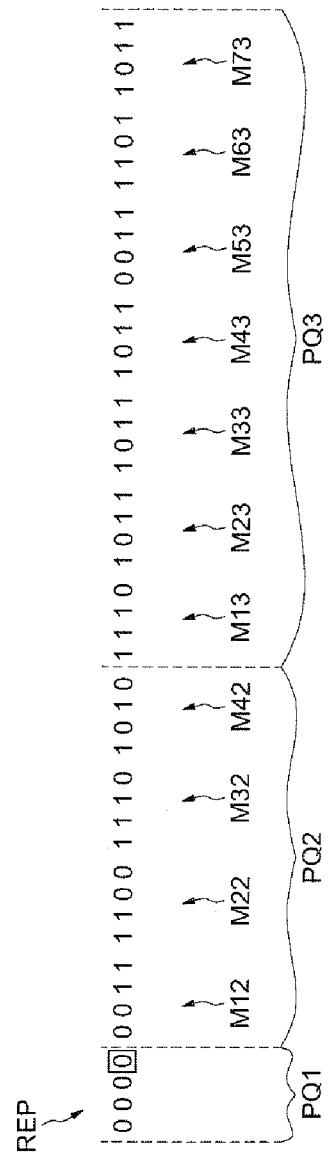

The third bit of the word of the packet PQ1 also has the logic "0" state because two slaves have the combination 01 in the first group G1 of two bits of their identifier (FIG. 7).

The same applies for the fourth bit of the word of the packet PQ1, because the slaves 7 and 8 have the combination 00 in the first group of two bits of their identifier UID7, UID8.

The words of four bits of the second packet PQ2 will now be generated by the slaves.

In the present case, since all the bits of the word of the packet PQ1 are at "0", the slaves will generate, in the packet PQ2, a word of four bits associated with each bit of the word of the packet PQ1.

The words of four bits of the packet PQ2 relate to the second group of two bits of the identifiers.

Also, once again, the combinations of possible values are tested in the order 11, 10, 01, 00.

The first word M12 of the second packet PQ2 is associated with the first bit of the word of the packet PQ1.

In other words, this word relates to the slaves whose identifiers begin with the combination of values 11.

Figure 9:
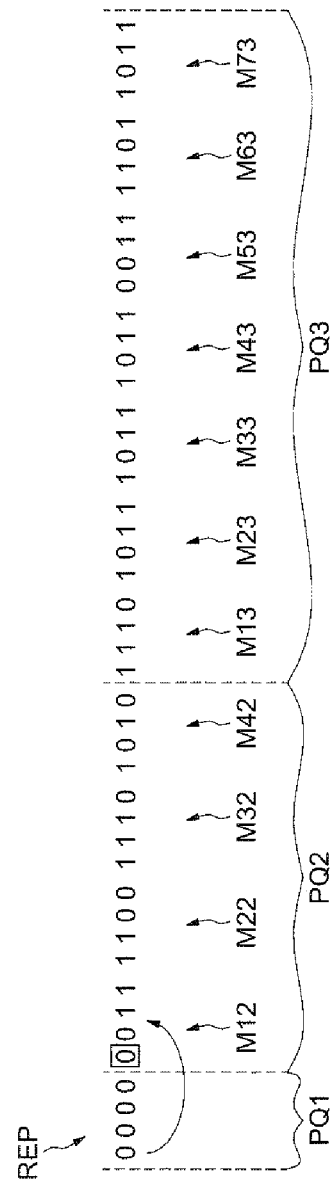
Figure 10:
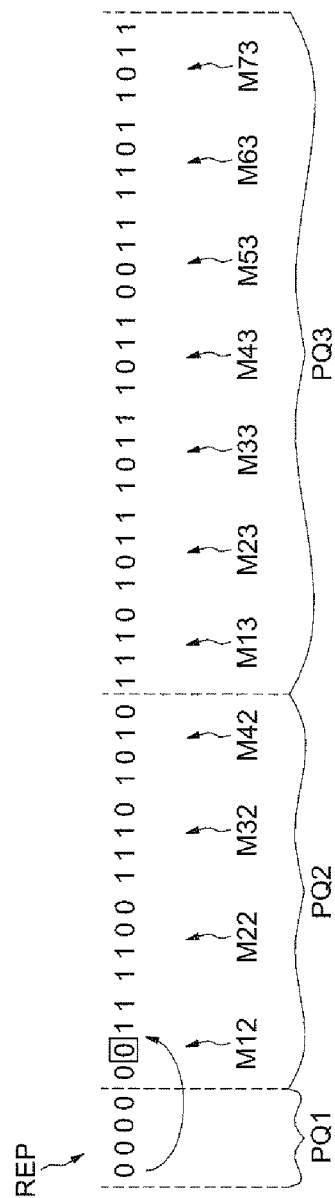

Since the slave 6 has the combination 11 in the second group G2 of two bits of its identifier UID6, the first bit of the word M12 has the value "0" (FIG. 9).

The same applies for the second bit of the word M12 of the packet PQ2 (FIG. 10) since the slave 4 has, in the second group G2 of two bits of its identifier UID4, the combination 10.

Given that no slave which had the combination 11 in the first group G1 of two bits of its identifier has the combination 01 or the combination 00 in the second group G2 of two bits of its identifier, the last two bits of the word M12 have the non-priority logic state, that is to say the logic "1" state.

The second word M22 of the packet PQ2 is associated with the second bit of the word of the packet PQ1.

Figure 11:
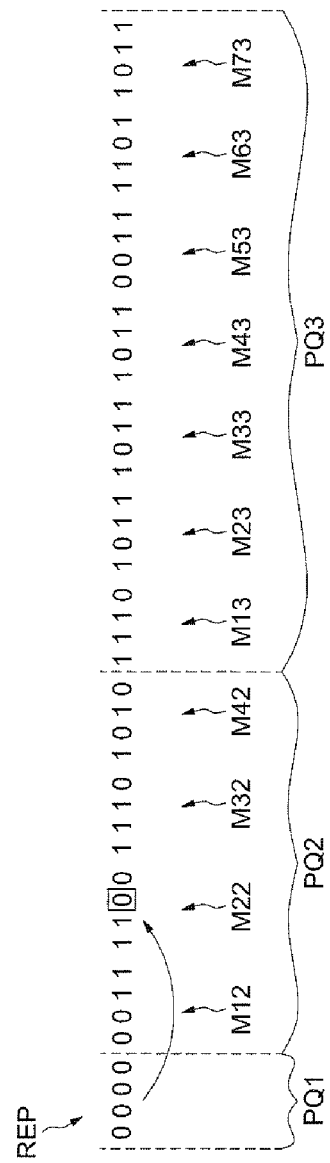

Since none of the identifiers which had in their first group G1 of two bits the combination 10, have either the combination 11 or the combination 10, the first two bits of the second word M22 of the packet PQ2 have the logic 1 value (FIG. 11).

However, the third bit of the word M22 has the logic "0" value since the slave 1 has in its identifier UID1 the combination 01 following the combination 10.

Figure 12:
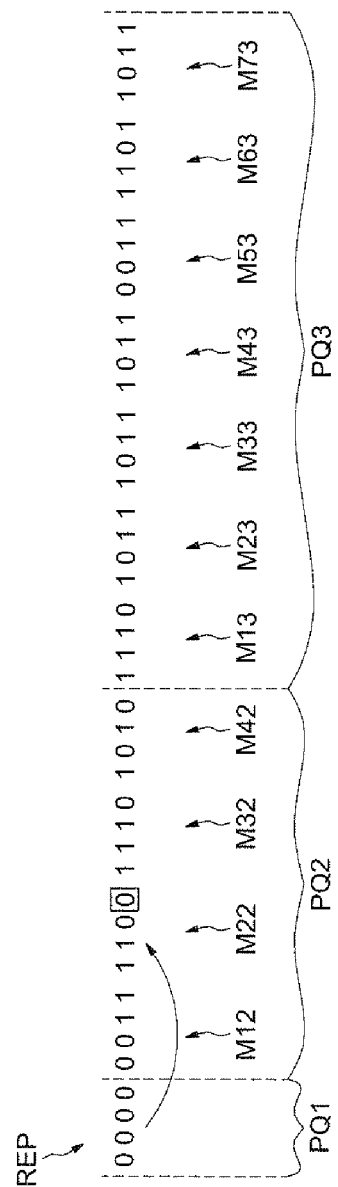

The last bit of the word M22 also has the logic "0" value because the identifier UID3 has the combination of values 00 following the combination of values 10 (FIG. 12).

Figure 13:
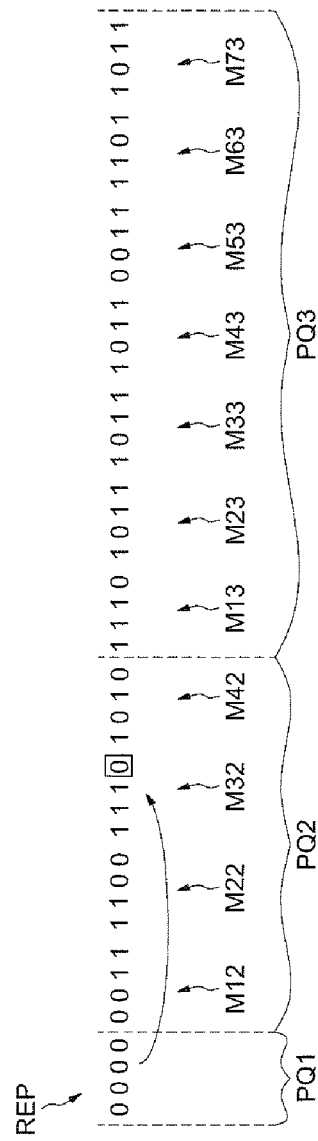

The third word M32 of the packet PQ2 is associated with the third bit of the word of the packet PQ1 (FIG. 13).

It can be seen in this figure that only the last bit of the word M32 has the logic "0" value because the identifiers which had the combination 01 in their first two bits have only the combination 00.

Figure 14:
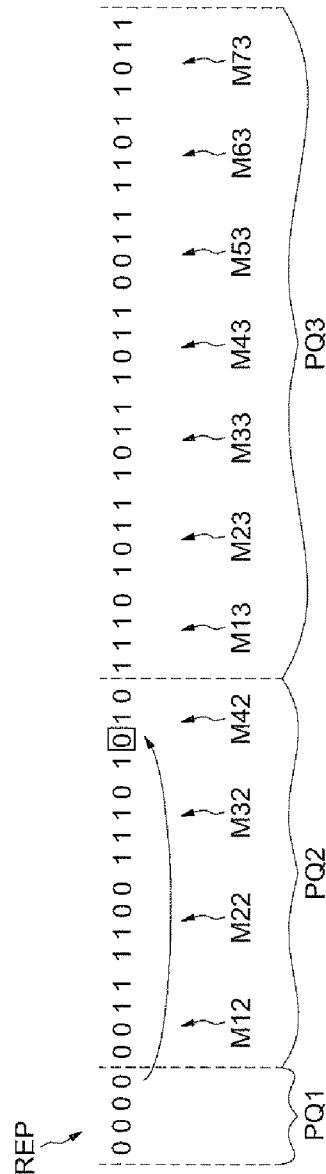

The fourth word M42 of the packet PQ2 is associated with the fourth bit of the word of the packet PQ1 (FIG. 14).

Figure 15:
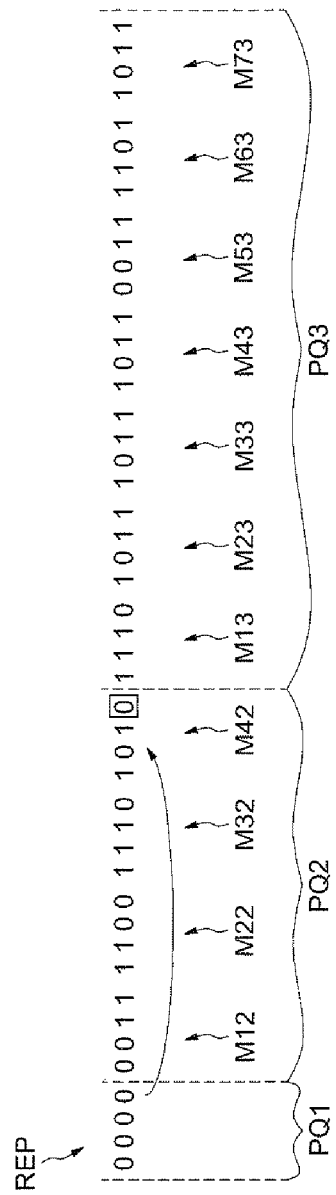

There, only the second bit and the fourth bit of the word M42 have the logic "0" value corresponding to the combination 10 following the combination 00 (FIG. 14) and to the combination 00 following the combination 00 (FIG. 15).

Figure 16:
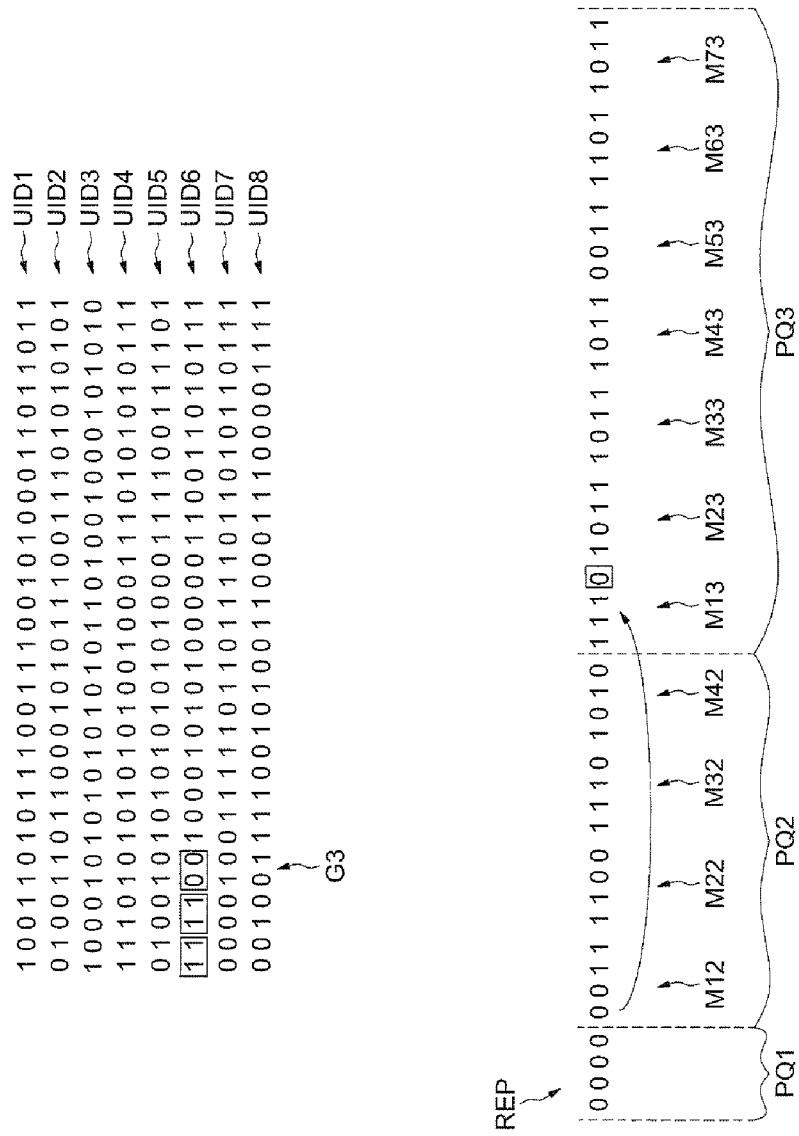

Since the packet PQ2 comprises seven bits in the logic "0" state, the packet PQ3 will comprise seven words M13-M73 respectively associated with these seven bits having the logic "0" value (FIG. 16).

The words of four bits of the packet PQ3 relate to the third group G3 of two bits of the identifiers.

The same process as that just described for the packet PQ2 is applied to the packet PQ3.

More specifically, as illustrated in FIG. 16, the first word M13 of the packet PQ3, which is associated with the first bit of the word M12 of the packet PQ2, has only the fourth bit having the logic "0" value corresponding to the combination 00 in the third group G3 of two bits of the identifier UID6, following the two combinations 11 and 11.

Figure 17:
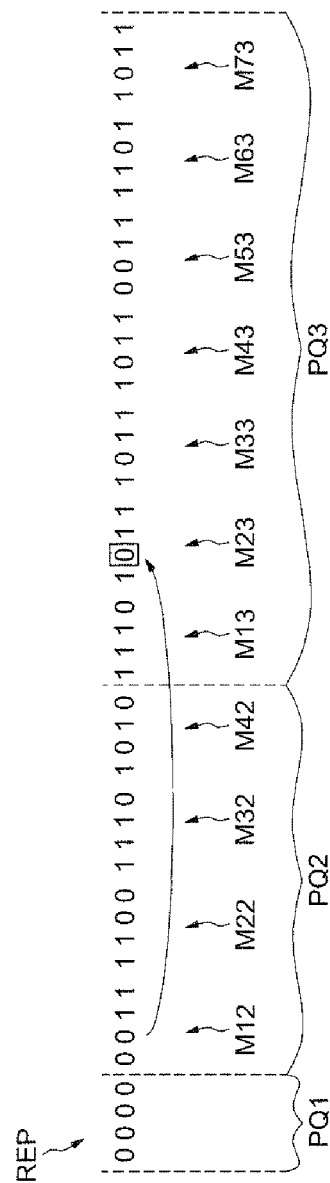
Figure 18:
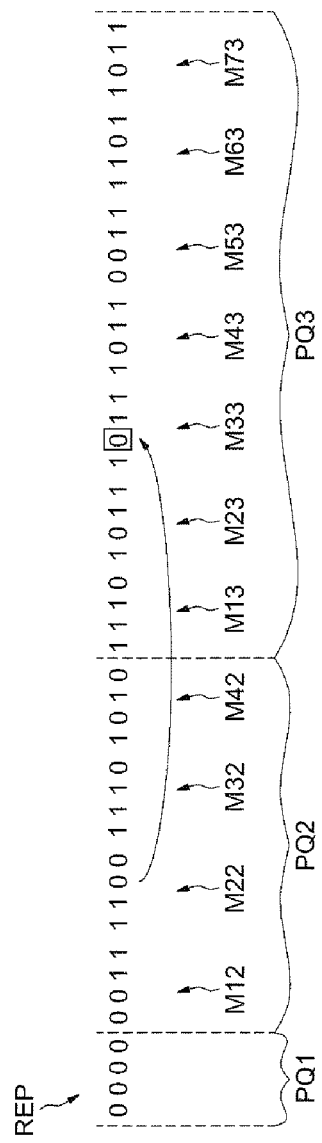

The second word M23 of the packet PQ3, associated with the second bit of the first word M12 of the packet PQ2, has only the second bit equal to 0, corresponding to the series of combinations 11, 10, 10 of the identifier UID4 (FIG. 17).

The third word M33 of the packet PQ3 associated with the third bit of the second word M22 of the packet PQ2 has only its third bit equal to 0 (FIG. 18), corresponding to the combination 10 following the two preceding combinations 10 and 01 of the identifier UID1.

Figure 19:
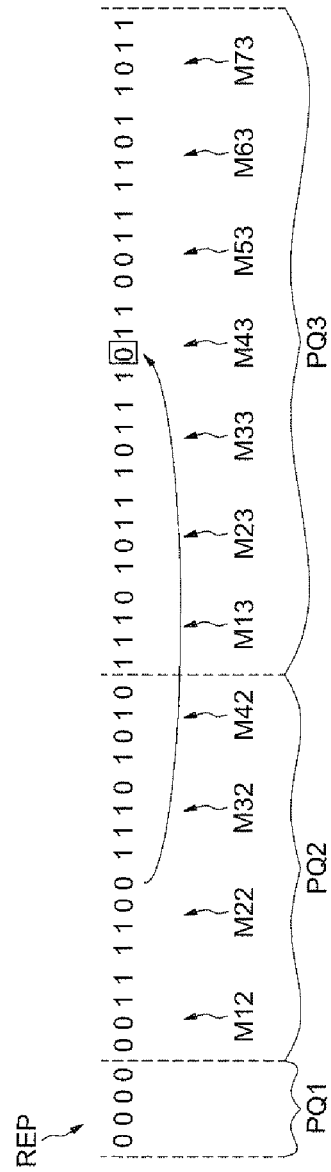
Figure 20:
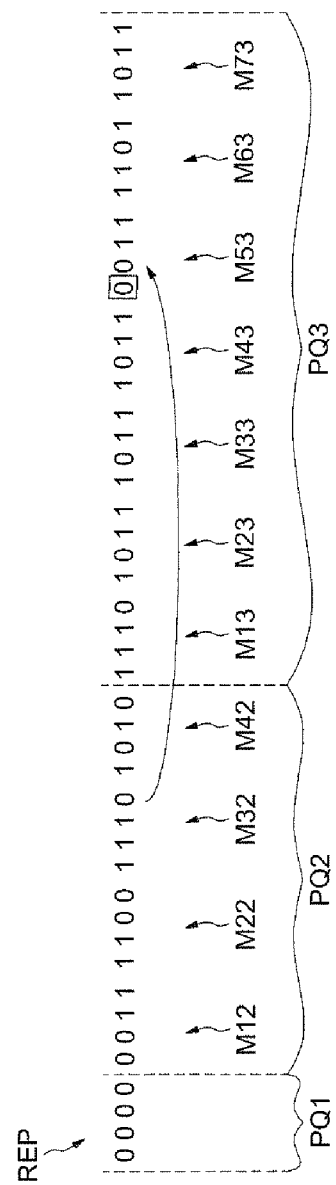
Figure 21:
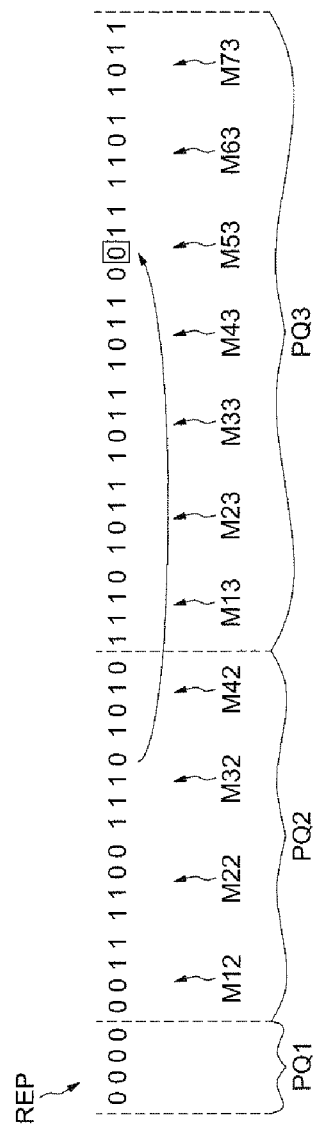

The fourth word M43 of the packet PQ3, associated with the fourth bit of the second word M22 of the packet PQ2, has only its second bit equal to 0, corresponding to the presence in the identifier UID3 of the combination 10 following the two preceding combinations 10 and 00 (FIG. 19).

The fifth word M53 of the third packet PQ3, associated with the fourth bit of the third word M32 of the packet PQ2, has its first two bits equal to 0 (FIG. 20 and FIG. 21) respectively corresponding to the combinations 11 and 10 present in the identifiers UID2, UID5 following the pair of preceding combinations 01 and 00.

Figure 22:
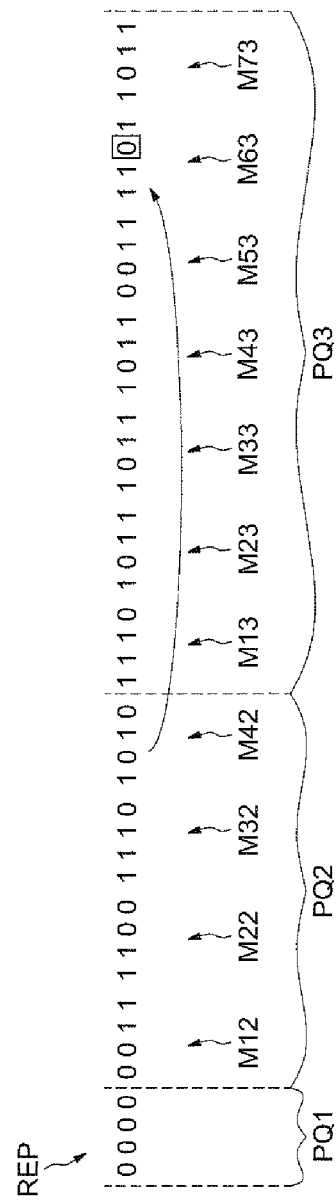

The sixth word M63 of the packet PQ3 associated with the second bit of the fourth word M42 of the packet PQ2 has only its third bit equal to 0, corresponding to the presence in the third group G3 of two bits of the identifier UID8 of the combination 01 following the pair of combinations 00 and 10 present in the groups G1 and G2 (FIG. 22).

Figure 23:
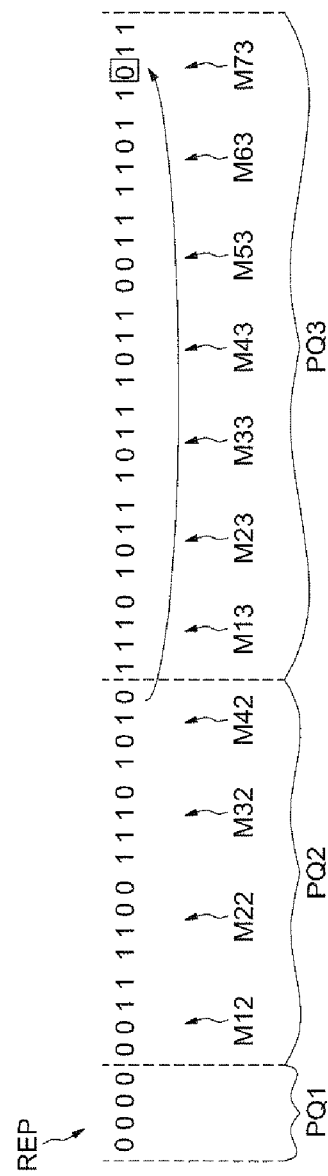

Finally, the seventh word M73 of the packet PQ3, associated with the last bit of the last word M42 of the second packet PQ2, has only its second bit equal to 0 corresponding to the presence of the combination 10 following the pair of combinations 00 and 00 of the identifier UID7 (FIG. 23).

It can therefore be seen here that the number of words of the first packet is equal to 1, and that the number of words of a packet of current rank greater than 1 depends on the number of words of the packet of preceding rank and on the values of the bits of these words.

More specifically, the number of words of the packet of current rank is equal to the number of bits having the priority logic state (0) in the packet of preceding rank.

Moreover, the sequencing of the words of the current packet associated with the current group of p bits of the identifiers depends on the value of the combination of the preceding group.

The different bits of the response REP circulating over the bus toward the master are generated by the slaves on each clock pulse.

Moreover, on each clock pulse, the master analyses the content of the bus so as to determine, progressively, the values of the bits of the identifiers on the basis of the values of the bits of the response.

Figure 24:
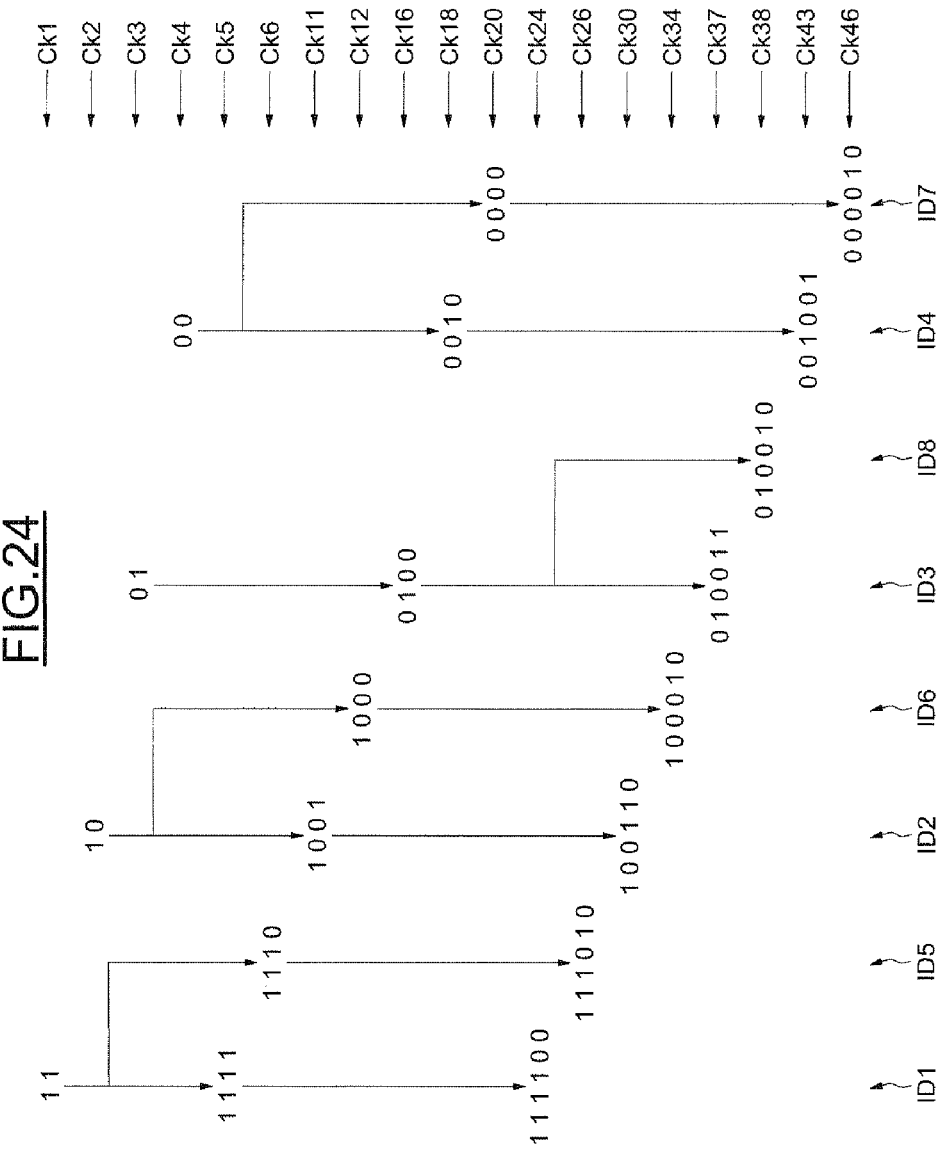

This is schematically illustrated in FIG. 24.

Thus, on the clock pulse CK1 corresponding to the reception of the first bit of the word of the first packet PQ1, the processing circuitry determine the first two bits 11 of a first identifier ID1.

On the next clock pulse CK2, the reception of the second bit of the word of the packet PQ1 makes it possible to generate the first bits 10 of a second identifier ID2.

The receptions of the other two bits of the word of the packet PQ1 then make it possible to determine the first two bits 01 of a third identifier ID3 and the first two bits 00 of a fourth identifier ID4.

On the clock pulse CK5, the reception of the corresponding bit of the response makes it possible to complete the other two bits of the identifier ID1 (bits 11).

Then, on the next clock pulse CK6, the reception of the corresponding bit of the response makes it possible to begin to generate a fifth identifier ID5 having the bits 1110 as the first four bits.

The clock pulse CK11 (reception of the fourth bit of the word M22 having the logic value 0) makes it possible to complete the identifier ID2 with the bits 01.

The next clock pulse (CK12) makes it possible to generate the first four bits (1000) of a sixth identifier IDG.

The clock pulse CK16 (reception of the third bit of the word M32 having the logic 0 value) makes it possible to complete the bits of the identifier ID3 (0100).

The clock pulse CK18 makes it possible to complete the bits of the identifier ID4 (0010).

The clock pulse CK20 (reception of the fourth bit of the word M42 having the logic 0 value) makes it possible to begin the generation of a seventh identifier ID7 (bits 0000).

It can be seen at this stage that seven different quadruplets of bits have been reconstructed.

However, this is not sufficient to identify eight slaves.

The progressive process of reconstruction of the identifiers by the master is therefore continued.

On the clock pulse CK24 the identifier ID1 is completed with the combination of bits 00.

The identifiers ID5, ID2, ID6 and ID3 are also successively completed with two bits on the clock pulses CK26, CK30, CK34 and CK37.

Then, on the clock pulse CK38 corresponding to the reception of the second bit of the fifth word M53 of the third packet PQ3, the first six bits of an eighth identifier ID8 are generated.

Finally, on the clock pulses CK43 and CK46, the identifiers ID4 and ID7 are respectively completed with the pair of bits 01 and 10.

Eight different sextuplets of bits, corresponding to eight different identifiers ID1-ID8, have therefore been obtained.

These eight sextuplets ID8 are sufficient to address the eight slaves.

The process can therefore be stopped.

It will be noted in this respect that the sextuplets ID1-ID8 respectively correspond to the starts of the identifiers UID6, UID1, UID2, UID8, UID4, UID3, UID7, UID5.

That said, if the number of the slaves had been unknown, it would have been necessary to continue the process so as to successively test all the groups of two bits of the identifiers.

It can be seen here that, according to one implementation of the method, the number of words on the bus does not increase exponentially when the groups of p successive bits of the identifiers are tested (which amounts to working down the branches of a tree structure), because, for each group Gi of p bits of rank i tested, there are statistically fewer and fewer combinations recognized with the rank i+1.

Thus, for a reasonable number of slaves, a single recognized combination (a single 0 in the word) is quickly obtained.

The sending of commands by the master during the process is not necessary because the latter recovers a continuous string of bits to be interpreted.

The master can simply send an initial command to initiate the process and end it with a specific command.

The string of bits sent by the slaves is not conditioned by any action on the part of the master.

Once the inventory is finished, it is possible to then define a simplified addressing for the slaves. In this respect, either the master or the slaves can define a dynamic address assigned to each slave (volatile or non-volatile address).

A typical exchange over an I2C bus containing the response REP of FIG. 4 is illustrated in FIG. 25.

More specifically, in this case, the exchange begins with a start bit S followed by a command C7-C0 followed by an acknowledgement bit from the slaves referenced "a".

Then, the response REP is transmitted in successive bits separated by acknowledgement bits "A" sent by the master. The stopping of the process is characterized by the transmission of an absence of acknowledgement bit referenced "Na".

Finally, the exchange ends with a stop bit referenced "BP".

The method can be interrupted if the response to the test of a group Gi of p bits of given rank contains in the corresponding packet as many priority logic values (0) as the expected number of slaves. Such is the case for the packet PQ3 which comprises eight "0" bits.

Generally, the maximum number of bits to be transmitted is equal to the number P of digital information bits (identifiers) multiplied by 2p/p, multiplied by the number of slaves.

As an example, for 128 slaves each having a 32-bit identifier, which corresponds to a set of 8192 bits, the maximum number of bits to be transmitted over an I2C bus taking into account the ninth bit A is equal to 9216 bits, which corresponds to a transmission time of 23 milliseconds for a bus frequency of 400 kHz.

Obviously, the number of bits may be considerably reduced by adjusting the value of p and by applying the analysis of the words by the slaves as described above.

In this respect, the determination of the number of words of the next packet is simply equal to the number of "0" bits received in the preceding packet. This information item may be advantageously used by the slaves during the analysis of the bus to output the responses at the right time and by the master to decode the frame received.

That said, it is also possible for the slaves not to analyze the content of the bus. In this case, the slaves will respond over the bus in light of a tree-structure of predetermined tests at the rate of the clock signal, by successively analyzing all the possible combinations of the different groups of bits of the identifiers. This will be reflected simply, in the example described above, in the insertion of words of four bits all having the logic "1" value into the response REP of FIG. 4.

The invention is not limited to the implementations and embodiments that have just been described but encompasses all the variants thereof.

Thus, although a bus comprising a single data wire has been described, it would be possible to provide a bus supporting a serial protocol of the open drain type, comprising a number of data wires intended to transmit response blocks in parallel. However, this changes nothing in the method that has just been described, and in the generation of the words and of the packets transmitted over the bus. Some words or some packets may then be transmitted in parallel over the different wires.

Obviously, the digital information items associated with the different slaves may be different in terms of identifiers. In other words, it is possible to recover, for example over an I2C bus, data other than those relating to an identifier. In this respect, the master may address a request that is broadcast to all present, and a number of slaves may respond simultaneously without individual addressing, and it is possible to reconstruct the individual data of each slave.

The invention can also be used in the "Serial Presence Detect (SPD)" functions used in the memory strips that conform to the JEDEC specifications, based on the SMBUS protocol, derived from the I2C.

The communication method described above can also be applied between modules intended to communicate a priori over a bus supporting a protocol other than a serial protocol of the priority logic state type. This other protocol may be, for example, the SPI protocol using output stages of the symmetrical type ("push-pull"). In this respect, provision is advantageously made to use, for each module, a configurable output stage capable of allowing serial buses of "push-pull" type to be modified in order to give them open drain type functionalities.

Figure 26:
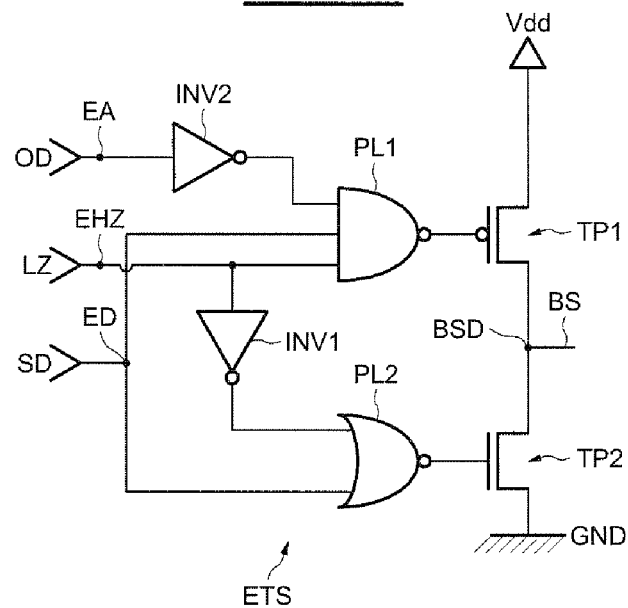
Figure 27:
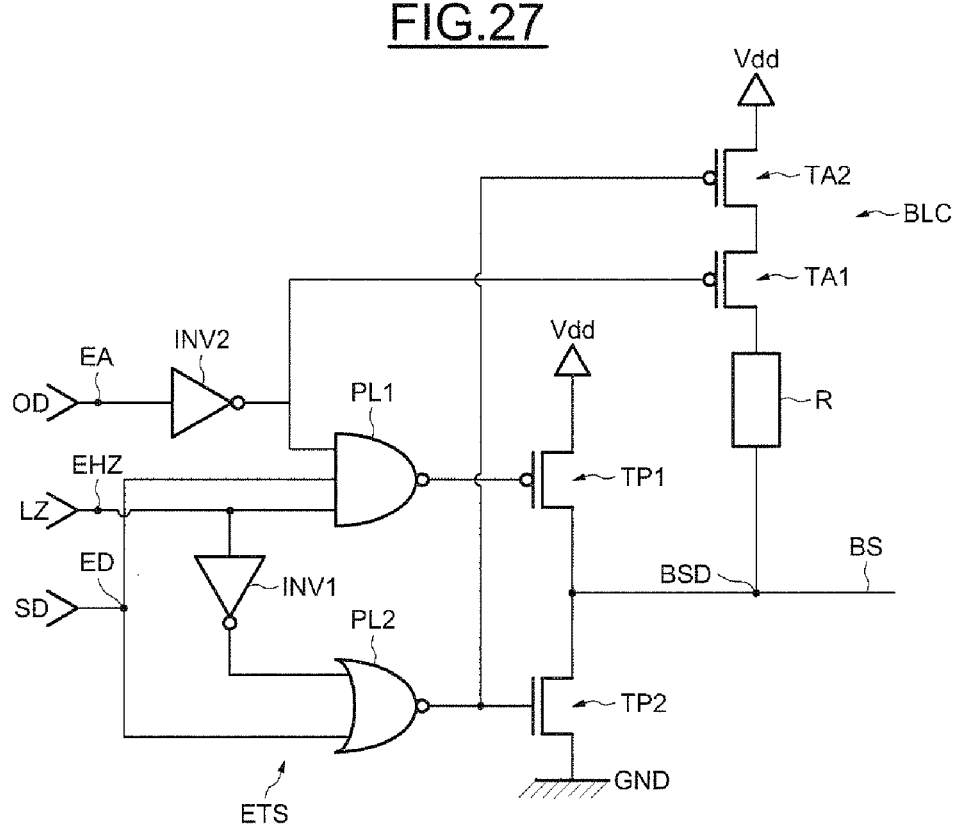
Figure 28:
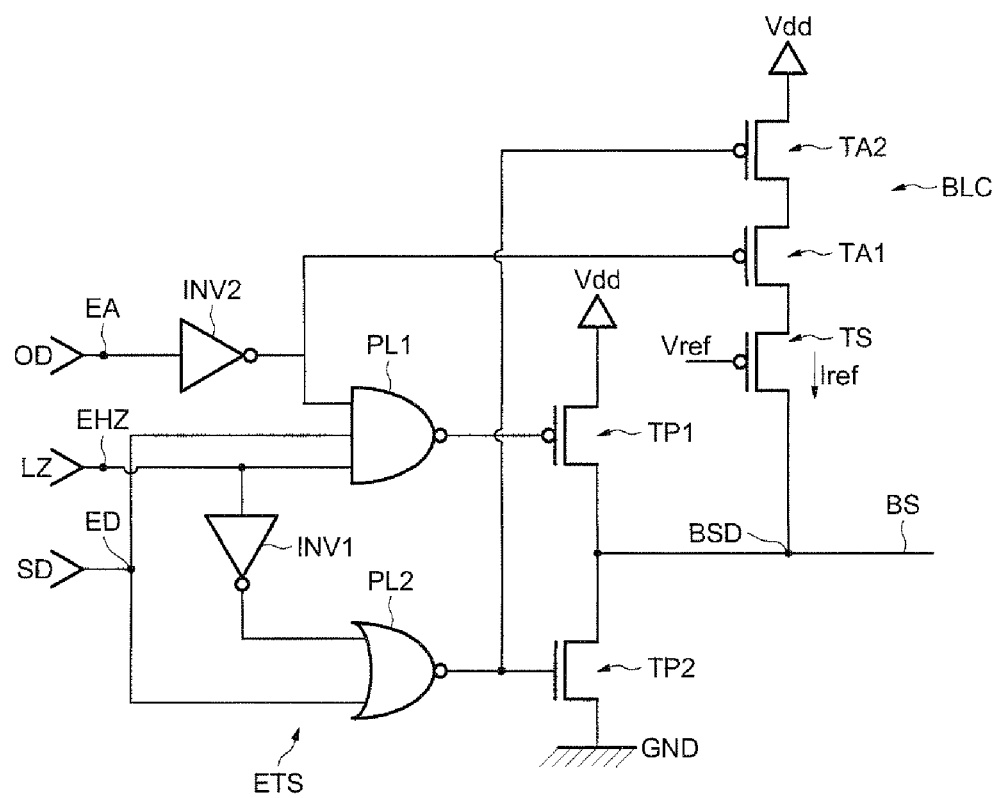

FIGS. 26 to 28 illustrate exemplary embodiments of such an output stage.

FIG. 26 schematically illustrates a first embodiment of a configurable output stage.

This output stage ETS comprises an input ED for receiving a signal SD, for example a data signal, and an output BSD connected to the bus BS, for example to the data wire of the bus.

The output stage also comprises a first main transistor TPI and a second main transistor TP2. These two transistors are complementary. In other words, one is, for example, a P-channel MOS transistor (transistor TP1) while the other is an N-channel MOS transistor (transistor TP2).

The source of the transistor TP1 is linked to a power supply terminal that can receive a power supply voltage Vdd, for example 5 volts.

The source of the second transistor TP2 is linked to the ground GND and the drains of the two transistors TP1 and TP2 are linked together to form the output terminal BSD.

The output stage also comprises a first logic gate PL1, in this case a NAND logic gate, and a second logic gate PL2, in this case a NOR logic gate.

The output of the logic gate PL1 is linked to the gate of the transistor TP1 and the output of the logic gate PL2 is linked to the gate of the transistor TP2.

A first input of the logic gate PL1 and a first input of the logic gate PL2 are connected together to the input terminal ED to receive the signal SD.

A second input of the logic gate PL1 and a second input of the logic gate PL2 are connected together via an inverter INV1. These second inputs are also connected to another input terminal EHZ of the output stage intended to receive a high impedance state command signal LZ.

Finally, a second inverter INV2 is connected between an activation input EA and a third input of the logic gate PL1. The activation input EA is intended to receive an activation signal OD.

This activation signal OD may be delivered, for example, by processing circuitry of the corresponding module MD.

When the activation signal OD is in the logic 0 state, the output stage is placed in a symmetrical (push-pull) type configuration.

In this configuration, the logic gates PL1, PL2, the inverter INV1, and the two main transistors TP1 and TP2 are a first circuit that forms an output stage of the "push-pull" type with three states including a high impedance state obtained when the high impedance command signal LZ has the logic 0 value.

When the activation signal is in logic 1 state, the gate PL1 which receives on its third input the logic 0 state (output of the inverter INV2) consequently blocks the transistor TP1.

The inverter INV1, the gate PL2 and the transistor TP2 are then a second circuit that forms an output stage of the open drain type, imposing on the bus BS a priority logic state, in this case a logic 0 state, when the transistor TP2 is conducting.

However, when the transistor TP2 is blocked, and provided that the other transistors of the other output stages connected to the bus are also blocked, the bus BS assumes the other logic state (in this case the logic "1" state) through the intermediary of at least one pull-up resistor conventionally connected between the bus and the power supply voltage Vdd.

In the embodiments illustrated in FIGS. 27 and 28, provision is made for the output stage ETS to incorporate a block BLC that makes it possible to provide the function for returning the bus to the non-priority logic state in an open drain configuration.

This block BLC is also activatable by the activation circuitry INV2. Moreover, the block BLC is arranged to be inactive when the second transistor TP2 is in its conducting state, that is to say, when the output stage imposes the priority logic state on the bus BS.

In this respect, as illustrated in FIGS. 27 and 28, the block BLC comprises a first auxiliary transistor TA1 whose gate is connected to the output of the activation circuitry (e.g., inverter INV2) and an element connected between the first auxiliary transistor and the output of the stage and capable of conferring the other logic state on the output of the stage when the second main transistor TP2 is in its blocked state.

This element is, in FIG. 27, a resistor R.

The block BLC also comprises a second auxiliary transistor TA2, in this case a P-channel MOS transistor, complementing the second main transistor TP2, connected between the first auxiliary transistor TA1 and the power supply terminal Vdd. The gate of the second auxiliary transistor TA2 is connected to the gate of the second main transistor TP2.

When the activation signal OA present on the activation input EA is in the logic 0 state, so as to configure the output stage in a push-pull type configuration, the transistor TA1 is blocked which renders the block BLC inoperative.

However, when the input EA of the inverter INV2 is in the logic 1 state, conferring on the output stage a configuration of the open drain type, the output of the inverter INV2 is in the logic 0 state causing the transistor TA1 to conduct.

Also, when the second transistor TP2 receives on its gate a logic 1 state, so as to make it conduct and impose the priority logic state on the bus BS, the second auxiliary transistor TA2 is blocked rendering the block BLC inactive.

However, when the transistor TP2 receives on its gate a logic 0 state, which causes it to be blocked, the transistor TA2 is conducting making it possible to pull up the bus to the power supply Vdd via the resistor R.

In the embodiment of FIG. 28, the resistor R is replaced by an active element, for example an additional PMOS transistor TS biased on its gate by a reference voltage Vref. The characteristics of the transistor TS and the reference voltage Vref are then adjusted so that the transistor TS is passed through by a current IRef that is lower than the current passing through the second main transistor TP2 in its conducting state.

Thus, according to one aspect of the invention, the activation signal very simply makes it possible to activate or deactivate the open drain function. This activation signal activates the open drain function prior to any operating mode requiring the open drain function, for example to implement the communication method illustrated in FIGS. 2 to 25. The reverse command makes it possible to revert to the standard push-pull mode, when the open drain function is no longer needed.

Thus, the compatibility is retained with a standard operating mode (push-pull mode) of the bus. If the open drain function is not activated, the standard SPI operation of the bus for example is retained undisturbed, in particular without increasing consumption and reducing speed.

What is claimed is:

1. A method for communication between a master module and a number of slaves coupled to a bus over which the slave modules communicate simultaneously with the master module according to a serial communication protocol of the priority logic state type, the method comprising:

receiving a plurality of successive packets of 2p-bit digital words at the master module, where p is greater than or equal to 1, the successive packets being respectively associated with successive groups of p digital information bits associated with the slave modules and intended to be communicated to the master module, the 2p bits of a current word of a current packet being respectively associated with the 2p possible combinations, taken in a predetermined order, of the values of the bits of the group associated with the current packet, the value of each bit of the current word having the priority logic state if the values of the p bits of the digital information item of at least one of the slave modules correspond to the combination of values associated with this bit, and the other logic state otherwise; and determining by the master module of the values of the bits of the digital information items associated with the slave modules on the basis of the values of the bits of the words successively received.

2. The method according to claim 1, further comprising analyzing the contents of the different words circulating successively over the bus, the number of words of the first packet is equal to one, and the number of words of a packet of current rank greater than one depends on the number of words of the packet of preceding rank and on the values of the bits of these words.

3. The method according to claim 1, wherein the analyzing is performed by the slaves.

4. The method according to claim 3, wherein the number of words of the packet of current rank is equal to the number of bits having the priority logic state in the packet of preceding rank.

5. The method according to claim 1, wherein p is equal to two.

6. The method according to claim 1, wherein p is equal to three.

7. The method according to claim 1, wherein the bus is an open drain or open collector bus with a priority logic state equal to zero.

8. The method according to claim 1, wherein the master module orders the stoppage of the transmission of the words over the bus after having determined only some of the values of the bits of the digital information items associated with the slave modules.

9. A device, comprising:

a bus;

a master module coupled to the bus; and a plurality of slave modules coupled to the bus wherein the slave modules are configured to communicate simultaneously with the master module according to a serial communication protocol of the priority logic state type, wherein the slave modules comprise transmission circuitry configured to transmit to the master module a succession of packets of digital words of 2p bits, p being greater than or equal to 1, the successive packets being respectively associated with successive groups of p bits of digital information items associated with the slave modules and intended to be communicated to the master module, the 2p bits of a current word of a current packet being respectively associated with the 2p possible combinations, taken in a predetermined order, of the values of the bits of the group associated with the current packet, the value of each bit of the current word having the priority logic state if the values of the p bits of the digital information item of at least one of the slave modules correspond to the combination of values associated with this bit, and the other logic state otherwise; and wherein the master module comprises processing circuitry configured to perform a determination of the values of the bits of the digital information items associated with the slave modules on the basis of the values of the bits of the words successively received.

10. The device according to claim 9, wherein the slave modules comprise analysis circuitry configured to analyze the contents of the different words circulating successively over the bus, and the transmission circuitry is configured to transmit the succession of packets in which the number of words of the first packet is equal to one, and the number of words of a packet of current rank greater than one depends on the number of words of the packet of preceding rank and on the values of the bits of these words.

11. The device according to claim 10, wherein the number of words of the packet of current rank is equal to the number of bits having the priority logic state in the packet of preceding rank.

12. The device according to claim 9, wherein p is equal to two.

13. The device according to claim 9, wherein p is equal to three.

14. The device according to claim 9, wherein the communication protocol is an open drain or collector communication protocol with a priority logic state equal to zero.

15. The device according to claim 9, wherein the master module also comprises control circuitry configured to order the stoppage of the transmission of the words over the bus after having determined only some of the values of the bits of the digital information items associated with the slave modules.

16. The device according to claim 9, wherein each slave module comprises an output stage of the open drain or collector type coupled to the bus.

17. The device according to claim 9, wherein each slave module comprises an output stage coupled to the bus and comprising a first activatable circuit arranged to configure the output stage in a configuration of the symmetrical type, a second activatable circuit arranged to configure the output stage in a configuration of the open drain or collector type, controllable activation circuitry configured to selectively activate the first activatable circuit or the second activatable circuit in response to an activation signal, the first activatable circuit and the second activatable circuit comprising a common part.

18. A slave module to be coupled to a bus and configured to communicate simultaneously with a master module according to a serial communication protocol of the priority logic state type, the slave module comprising:

transmission circuitry configured to transmit to the master module a succession of packets of digital words of 2p bits, p being greater than or equal to 1, the successive packets being respectively associated with successive groups of p bits of digital information items associated with the slave modules and intended to be communicated to the master module, the 2p bits of a current word of a current packet being respectively associated with the 2p possible combinations, taken in a predetermined order, of the values of the bits of the group associated with the current packet, the value of each bit of the current word having the priority logic state if the values of the p bits of the digital information item of at least one of the slave modules correspond to the combination of values associated with this bit, and the other logic state otherwise, wherein the master module can perform a determination of the values of the bits of the digital information items associated with the slave modules on the basis of the values of the bits of the words successively received.

19. The slave module according to claim 18, further comprising analysis circuitry configured to analyze the contents of the different words circulating successively over the bus.

20. The slave module according to claim 19, wherein the transmission circuitry is configured to transmit the succession of packets in which the number of words of the first packet is equal to one, and the number of words of a packet of current rank greater than one depends on the number of words of the packet of preceding rank and on the values of the bits of these words.

21. The slave module according to claim 20, wherein the number of words of the packet of current rank is equal to the number of bits having the priority logic state in the packet of preceding rank.

22. The slave module according to claim 18, wherein p is equal to two.

23. The slave module according to claim 18, wherein p is equal to three.

24. The slave module according to claim 18, wherein the communication protocol is an open drain or collector communication protocol with a priority logic state equal to zero.

25. The slave module according to claim 18, further comprising an output stage of the open drain or collector type to be coupled to the bus.

26. The slave module according to claim 18, further comprising an output stage to be coupled to the bus and comprising a first activatable circuit arranged to configure the output stage in a configuration of the symmetrical type, a second activatable circuit arranged to configure the output stage in a configuration of the open drain or collector type, controllable activation circuitry configured to selectively activate the first activatable circuit or the second activatable circuit in response to an activation signal, the first activatable circuit and the second activatable circuit comprising a common part.

* * * * *